United States Patent
Chen et al.

(10) Patent No.: US 10,545,615 B2
(45) Date of Patent: Jan. 28, 2020

(54) TOUCH DEVICE AND TOUCH DEVICE RECOGNITION METHOD

(71) Applicant: Qisda Corporation, Taoyuan (TW)

(72) Inventors: Chang-Cheng Chen, Taoyuan (TW); Wei-Jou Chen, Hsinchu County (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/167,732

(22) Filed: Oct. 23, 2018

(65) Prior Publication Data

US 2019/0146630 A1 May 16, 2019

(30) Foreign Application Priority Data

Nov. 15, 2017 (CN) .......................... 2017 1 1131815

(51) Int. Cl.
| | |
|---|---|
| G06F 3/041 | (2006.01) |
| G06F 3/0488 | (2013.01) |
| G06F 3/042 | (2006.01) |
| G06F 3/0362 | (2013.01) |

(52) U.S. Cl.
CPC .......... *G06F 3/0418* (2013.01); *G06F 3/0362* (2013.01); *G06F 3/0421* (2013.01); *G06F 3/04883* (2013.01); *G06F 2203/04106* (2013.01)

(58) Field of Classification Search
CPC .. G06F 3/0418; G06F 3/04883; G06F 3/0421; G06F 2203/04106; G06F 3/0488; G06F 3/04162; G06F 3/0442; G06F 3/0416; G06F 3/042; G06F 3/04186; G06F 3/0441; G06F 3/0362
See application file for complete search history.

(56) References Cited

U.S. PATENT DOCUMENTS

| | | | | |
|---|---|---|---|---|
| 2010/0005418 | A1* | 1/2010 | Miyazaki | G06F 3/0483 715/823 |
| 2011/0291944 | A1* | 12/2011 | Simmons | G06F 3/0416 345/173 |
| 2013/0135262 | A1* | 5/2013 | Alameh | G06F 3/0383 345/179 |
| 2016/0266720 | A1* | 9/2016 | Chang | G06F 3/0418 |
| 2016/0378212 | A1* | 12/2016 | Kim | G06F 3/03545 345/173 |
| 2017/0262084 | A1* | 9/2017 | Qiao | G06F 3/03545 |
| 2019/0025949 | A1* | 1/2019 | Parikh | G06F 3/03545 |
| 2019/0121453 | A1* | 4/2019 | Dekel | G06F 3/03545 |

FOREIGN PATENT DOCUMENTS

| | | |
|---|---|---|
| CN | 106406576 A | 2/2017 |
| TW | 201203017 A | 1/2012 |

OTHER PUBLICATIONS

Office action of counterpart application by Taiwan IP Office dated Apr. 25, 2018.

* cited by examiner

*Primary Examiner* — Premal R Patel

(57) ABSTRACT

A touch device including a touch screen, a first input device and a processor is provided. At a first start time, when the first input device touches on the touch screen with a first touch area at a first position, the touch screen generates a first event, and the first input device transmits a first signal to the touch screen. The processor is coupled to the touch screen. When the touch screen receives the first signal during a pre-determined period from the first start time and the first touch area is larger than a first area threshold, the processor determines that the first event belongs to the first input device and that the first position is a start position of the first input device.

20 Claims, 4 Drawing Sheets

TOUCH DEVICE AND TOUCH DEVICE RECOGNITION METHOD

This application claims the benefit of People's Republic of China application Serial No. 201711131815.3, filed Nov. 15, 2017, the subject matter of which is incorporated herein by reference.

BACKGROUND OF THE INVENTION

Field of the Invention

The invention relates in general to a touch device and a touch device identification method, and more particularly to a touch device and a touch device identification method for determining an input device.

Description of the Related Art

Generally, the user can input texts or drawings to a touch panel through a touch device. Examples of most commonly seen touch devices include stylus and dial controller. The stylus and the dial controller are two active input devices for the touch screen. The stylus has a pen shape and the dial controller has a round bottom shape. Both the stylus and the dial controller can generate a touch trace after contacting the touch panel. However, when more than two touch devices touch the touch panel at the same time, the touch panel may not correctly determine which touch trace belongs to which touch device. Under such circumstance, the user's handwriting may not be correctly judged, and the user will have a poor experience with the touch panel.

Therefore, to provide a touch device and a touch device identification method for conveniently identifying the touch trace belongs to the related touch device has become a prominent task for the industries.

SUMMARY OF THE INVENTION

According to one embodiment of the invention, a touch device including a touch screen, a first input device and a processor is provided. At a first start time, the first input device touches on the touch screen with a first touch area at a first position, the touch screen generates a first event and the first input device transmits a first signal to the touch screen. The processor is coupled to the touch screen. When the touch screen receives the first signal during a pre-determined period from the first start time and the first touch area is larger than a first area threshold, the processor determines that the first event belongs to the first input device and that the first position is a start position of the first input device.

According to another embodiment of the invention, a touch device identification method is provided. The touch device identification method includes following steps: touching, at a first start time, on a touch screen at a first position with a first touch area by a first input device; generating a first event by the touch screen; transmitting a first signal to the touch screen by the first input device; and determining, by a processor, that the first event belongs to the first input device and the first position is a start position of the first input device when the touch screen receives the first signal during a pre-determined period from the first start time and the first touch area is larger than a first area threshold.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the embodiments of the invention are made with reference to accompanying drawings. The embodiments are not for limiting the scope of protection of the invention. The descriptions of the structure and operations are not for limiting the order of execution, and any equivalent devices formed by the structures formed of different arrangements of the elements are within the scope of protection of the invention. Moreover, the dimension scales used in the accompanying drawings are not based on actual proportion of the product. Designations common to the accompanying drawings are used to indicate identical or similar elements.

Moreover, ordinal numbers, such as "the first", "the second", and etc., are used in the specification and claims to differentiate the elements or operations described using the same terminologies, not to designate specific sequence or order or limit the invention.

Figure 1:
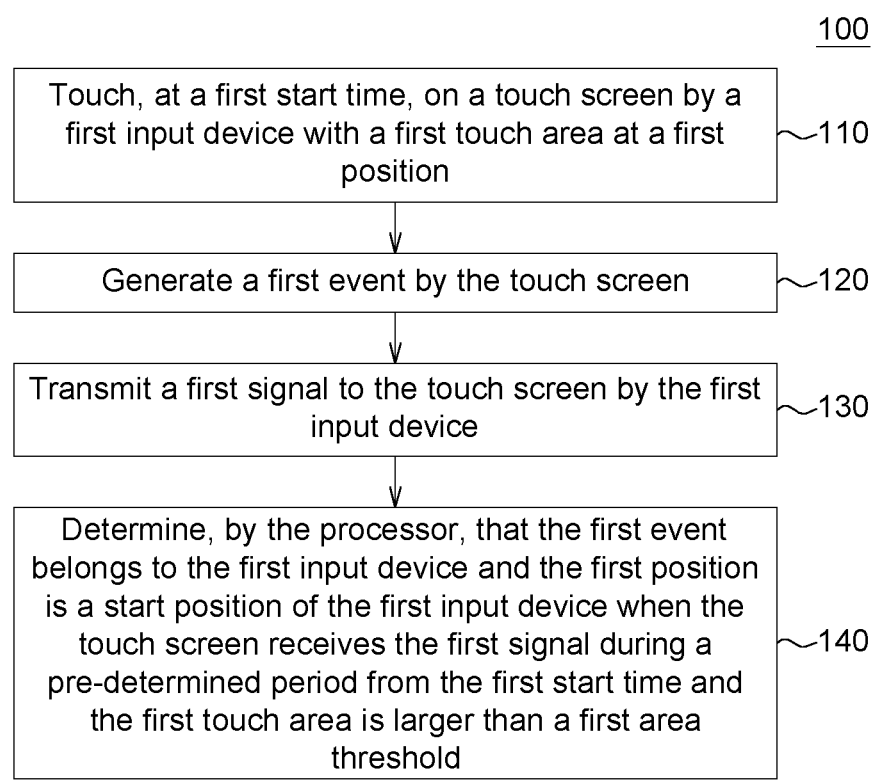
FIG. 1 is a flowchart of a touch device identification method according to an embodiment of the invention.
Figure 2A:
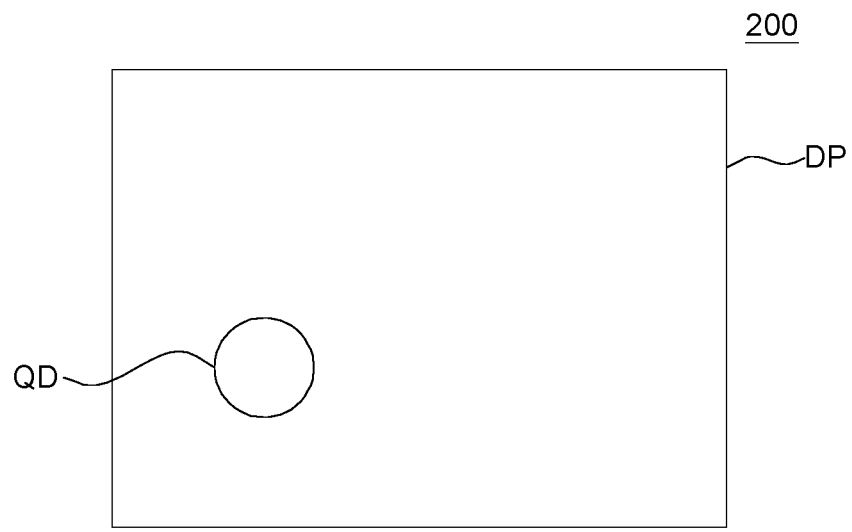
FIGS. 2A to 2B are schematic diagrams of a usage scenario of a touch device according to an embodiment of the invention.
Figure 2B:
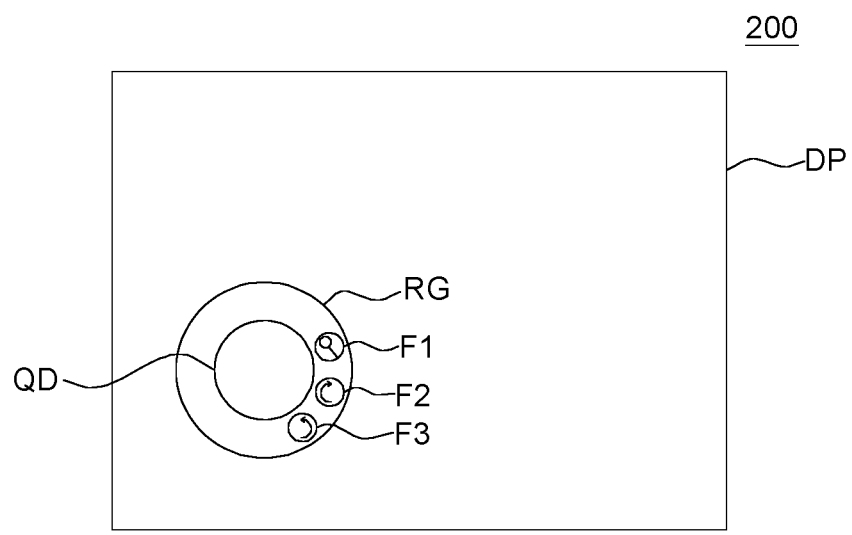

Refer to FIGS. 1, and 2A to 2B. FIG. 1 is a flowchart of a touch device identification method 100 according to an embodiment of the invention. FIGS. 2A to 2B are schematic diagrams of a usage scenario of a touch device 200 according to an embodiment of the invention.

In an embodiment, the touch device 200 includes a touch screen DP, a first input device QD and a processor (not illustrated). The processor is coupled to the touch screen DP.

In an embodiment, the touch screen DP is an optical touch screen.

In an embodiment, the processor can be realized by a microcontroller, a microprocessor, a digital signal processor, an application specific integrated circuit (ASIC) or a logic circuit.

In an embodiment as indicated in FIG. 2A, the first input device QD is a dial controller with a round bottom shape. In an embodiment as indicated in FIG. 2B, when the first input device QD is placed on the touch screen DP, a toolbar area RG of the touch screen DP surrounding the first input device QD displays quick selection icons F1 to F3, which provide more support and convenience to the user with operations such as making drawings, editing files or operating the touch screen DP. In an embodiment, the first input device QD is a cylinder or a cone.

For the convenience of explanation, in the following embodiments, the first input device QD is exemplified by an electrical dial controller with a round bottom shape, and the second input device QP is exemplified by an electrical stylus. However, anyone ordinarily skilled in the technology field will understand that the invention is not limited thereto, and the first input device QD and the second input device QP of the invention can be realized by the stylus with different sizes or other device used for inputting touch signals to the touch screen DP.

In an embodiment, the first input device QD, being an active device, transmits a signal with a QD's identification code to the touch screen DP when contacting the touch screen DP. In an embodiment, the second input device QP is an active device, and will transmit a signal with a QP's identification code to the touch screen DP when contacting the touch screen DP.

In step 110, at a first start time, the first input device QD touches on the touch screen DP with a first touch area at a first position.

In an embodiment, the first start time is "701", the first input device QD touches the first touch area of 7 pixels of the touch screen at the first position. The first position is a coordinate position at which the touch screen DP is touched.

In step 120, a first event is generated by the touch screen DP.

In an embodiment, the first event is generated by the touch screen DP according to the first touch area, the first position and the first start time. The first event includes the information of the first touch area, the first position and the first start time.

In step 130, when the first input device QD touches the touch screen DP, the first input device QD begins to continuously transmit a first signal with a first identification code until the first input device QD stop touching the touch screen DP.

In step 140, when the touch screen DP receives the first signal during a pre-determined period (such as 10 microseconds) from the first start time and the first touch area (such as 7 pixels) is larger than a first area threshold (for example, the processor predetermines the first area threshold as 6 pixels), the processor can determine the first event is belonging to the first input device QD (such as the dial controller) and the first position is used as the start position of the first input device QD.

In an embodiment, the processor can determine that the first input device QD is a dial controller, not a stylus, according to the first identification code in the first signal and the first touch area which is larger than the first area threshold.

In an embodiment, the processor designates the first identification code (for example, the first identification code is designated as "2") to the first input device QD according to the first touch area, the first start time and the information of the first signal. When the first input device continuously contacts the touch screen DP, the touch screen DP displays a pattern at the start position corresponding to the first input device QD. In an embodiment, the pattern is such as the quick selection tools F1 to F3 of FIG. 2B or a movement trace of the first input device QD.

Through the setting of the first area threshold, whether the current touch area belongs to the first input device QD or other touch device corresponding different areas can be determined.

In the present embodiment, the touch area of the stylus is normally smaller than 6 pixels (this value is for exemplary purpose only, and can be adjusted according to actual situations) and the touch area of the dial controller is normally larger than 6 pixels. Therefore, the processor determines that the first touch area (such as 7 pixels) is larger than a first area threshold and can confirm that the first input device QD is the dial controller, not the stylus.

In an embodiment, when the touch area (such as 7 pixels) at which the first input device QD touches the touch screen DP is smaller than or equivalent to a second area threshold (for example, the processor predetermines the second area threshold as 20 pixels), the touches can be neglected by the touch screen DP. In an embodiment, when the touch area (such as 7 pixels) at which the first input device QD touches the touch screen DP is larger than the second area threshold (for example, the processor predetermines the second area threshold as 3 pixels), the first event is generated.

Through the setting of the second area threshold, mistouches can be filtered off or neglected.

Figure 3:
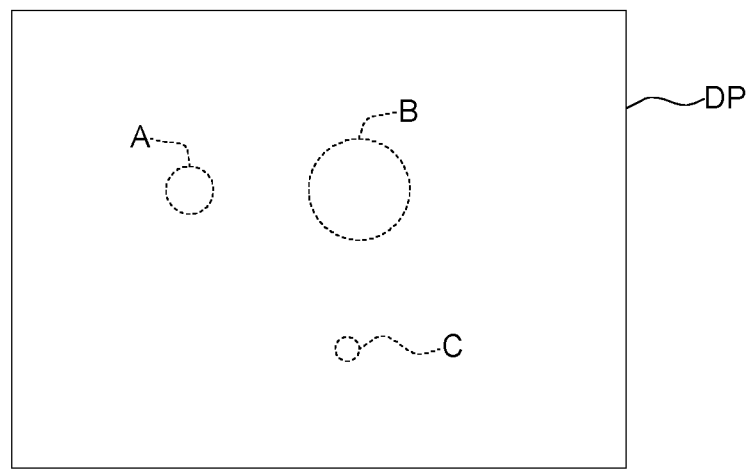
FIG. 3 is a schematic diagram of a touch area according to an embodiment of the invention.

Referring to FIG. 3, a schematic diagram of touch areas A, B, and C according to an embodiment of the invention is shown. In the present embodiment, it is supposed that the touch area of the dial controller is normally larger than 20 pixels. When the touch area (such as 7 pixels) at which the first input device QD touches the touch screen DP within a touch time is smaller than or equivalent to 20 pixels, the said touch may be a mistouch. Therefore, in FIG. 3, the touch area A has 7 pixels, the touch area B has 25 pixels, and the touch area C has 3 pixels. Since both the touch area A and the touch area C are smaller than 20 pixels, the touch area A and the touch area C may be mistouches, and the two touches are therefore neglected.

Figure 4:
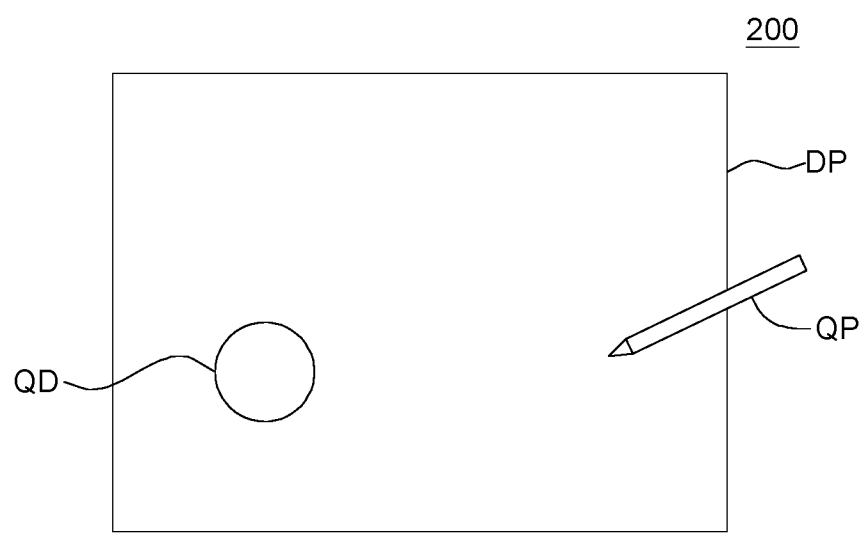
FIG. 4 is a schematic diagram of another usage scenario of a touch device according to an embodiment of the invention.

Referring to FIG. 4, a schematic diagram of another usage scenario of a touch device 200 according to an embodiment of the invention is shown. In an embodiment, it is supposed that the first input device QD is already placed on the touch screen DP and the time parameter is "701", the second input device QP (such as the stylus) touches a second touch area at a second position of the touch screen DP at a second start time (for example, time parameter is "710"), the touch screen DP generates a second event, and the second input device QP transmits the second signal to the touch screen DP. The first touch area (referring to the touch area of the first input device QD) is larger than the second touch area (referring to the touch area of the second input device QP). When the touch screen DP receives the second signal during the pre-determined period (such as 10 microseconds) from the second start time and determines that the second touch area is smaller than the first area threshold, the touch screen DP determines that the second event belongs to the second input device QP and that the second position is the start position of the second input device QP.

In an embodiment, the first start time and the second start time are the same time. For example, the first input device QD and the second input device QP are placed on the touch screen DP at the same time.

In an embodiment, the processor can determine that the second input device QP is a stylus, not a dial controller, according to the second signal.

In an embodiment, touches during a pre-determined period (such as 10 microseconds) are determined as the same continuous touch (for example, the same stroke) rather than another touch trace. Conversely, when a second stroke is made 3 seconds after the previous stroke, the second touch has exceeded the pre-determined period, and cannot be regarded as the same touch with the previous touch. The second touch could be made by different touch device or could be made by mistake, and therefore cannot be regarded as the same touch with the previous touch.

In an embodiment, the second signal includes a second identification code (for example, the processor predetermines the second identification code as 1), the processor designates the second identification code to the second input device QP. When the second input device QP is still on the touch screen DP and the second input device QP moves on the surface of the touch screen DP, the touch screen DP displays a movement trace (such as the trace of the stylus) of the second input device QP corresponding to the start position.

In an embodiment, the processor further calculates a difference (such as 9) between a first start time (the time parameter is 701) and the second start time (the time parameter is 710). If the difference is larger than a pre-determined period (such as 5 time units), the processor determines that the first event belongs to the first input device QD when receiving the first signal and determines that the second event belongs to the second input device QP when receiving the second signal.

In an embodiment, the touch device 200 includes a storage device (not illustrated) for storing the first identification code corresponding to the first event, the second identification code corresponding to the second event, the first start time corresponding to the first event, the second start time corresponding to the second event, the first touch area corresponding to the first event, and the second touch area corresponding to the second event.

Figure 5:
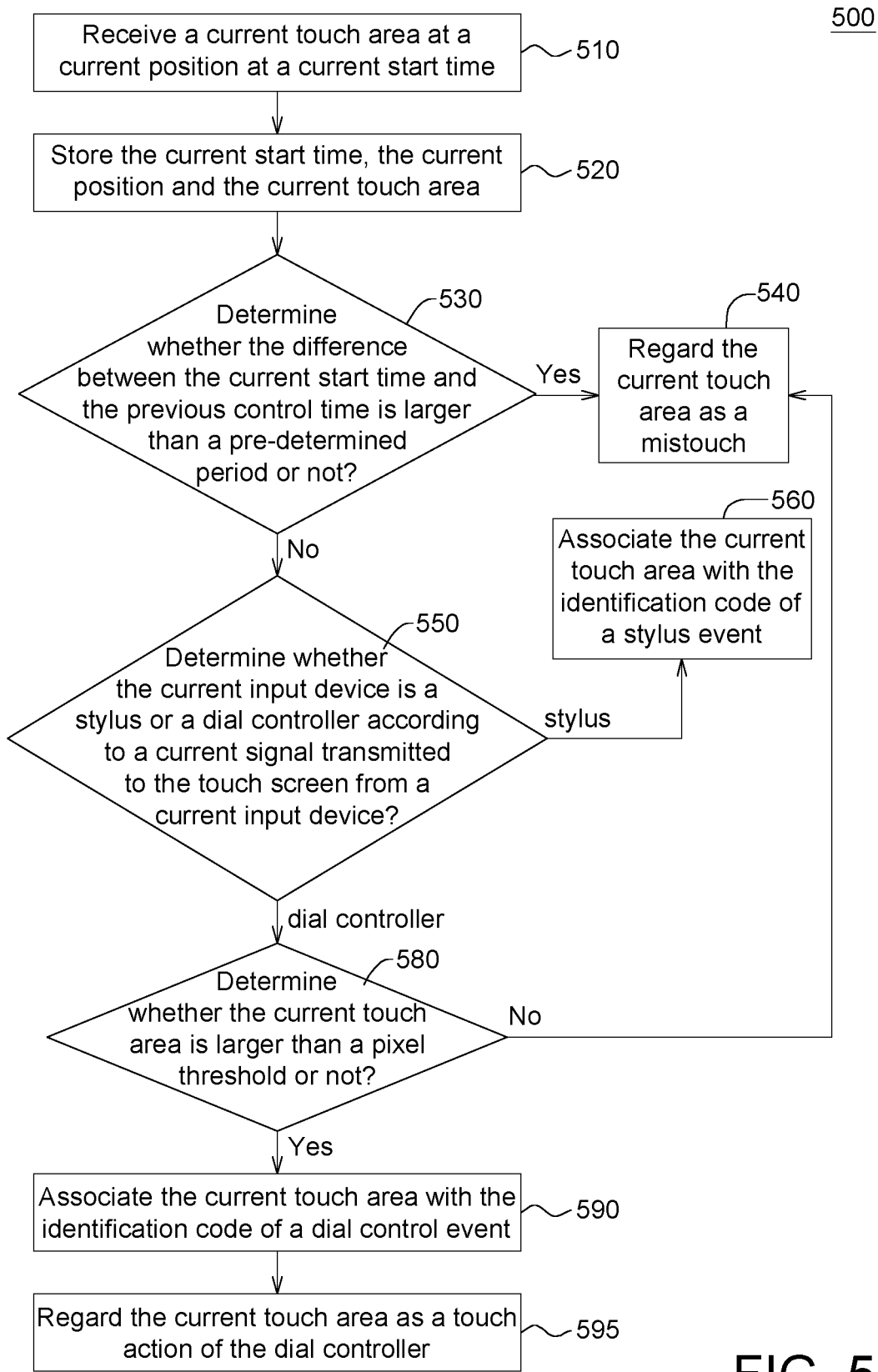
FIG. 5 is a flowchart of a touch device identification method according to an embodiment of the invention.

Referring to FIG. 5, a flowchart of a touch device identification method 500 according to an embodiment of the invention is shown.

In step 510, a current touch area at a current position is received by the touch screen DP at a current start time.

In step 520, the current start time, the current position and the current touch area are stored in the storage device.

In step 530, whether the difference between the current start time and the previous control time is larger than a pre-determined period is calculated by the processor. If yes, that implies the current touch area and the previous touch area are not associated with each other, and the method proceeds to step 540 in which the current touch area is regarded as a mistouch; if no, the method proceeds to step 550.

In step 550, the processor determines whether the current input device is a stylus or a dial controller according to a current signal transmitted to the touch screen DP. If the processor determines that the current input device is the stylus, then the method proceeds to step 560, in which the current touch area is associated with the identification code of a stylus event. If the processor determines that the current input device is the dial controller, then the method proceeds to step 580, in which whether the current touch area is larger than a pixel threshold is determined by the processor. If the processor determines that the current touch area is larger than pixels threshold, then the method proceeds to step 590, in which the current touch area is associated with the identification code of a dial control event, and the method proceeds to step 595, in which the current touch area is regarded as a touch action of the dial controller. If the processor determines that the current touch area is not larger than pixels threshold, then the method proceeds to step 540, in which the current touch area is regarded as a mistouch.

To summarize, the touch device and the touch device identification method disclosed in above embodiments of the invention identify which touch trace belongs to which touch device, and provide better touch panel experience to the user.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch device, comprising:
   a touch screen;
   a first input device, wherein at a first start time, when the first input device touches on the touch screen with a first touch area at a first position, the touch screen generates a first event and the first input device transmits a first signal to the touch screen; and
   a processor coupled to the touch screen, wherein when the touch screen receives the first signal during a pre-determined period from the first start time and the first touch area is larger than a first area threshold, the processor determines that the first event belongs to the first input device and that the first position is a start position of the first input device.

2. The touch device according to claim 1, wherein when the first input device touches the touch screen with a touch area which is smaller than or equivalent to a second area threshold, the touch screen ignores at least one touch of the first input device, when the touch area is larger than the second area threshold, the first event is generated.

3. The touch device according to claim 1, wherein the first signal comprises a first identification code, the processor designates the first identification code to the first input device, when the first input device keeps touching on the touch screen, the touch screen displays a pattern at the start position corresponding to the first input device.

4. The touch device according to claim 3, further comprising:
   a storage device used for storing the first identification code corresponding to the first event, a second identification code corresponding to a second event, the first start time corresponding to the first event, a second start time corresponding to the second event, the first touch area corresponding to the first event, and a second touch area corresponding to the second event.

5. The touch device according to claim 1, further comprising:
   a second input device, wherein at a second start time, the second input device touches the touch screen with a second touch area at a second position, the touch screen generates a second event and the second input device transmits a second signal to the touch screen, the first touch area is larger than the second touch area, when the touch screen receives the second signal during the pre-determined period from the second start time and the second touch area is smaller than the first area threshold, the processor determines that the second event belongs to the second input device and that the second position is a start position of the second input device.

6. The touch device according to claim 5, wherein the second signal comprises a second identification code, the processor designates the second identification code to the second input device, when the second input device keeps touching on the touch screen and the second input device moves on a surface of the touch screen, the touch screen displays a movement trace of the second input device corresponding to the start position of the second input device.

7. The touch device according to claim 5, wherein the first start time and the second start time are the same time.

8. The touch device according to claim 5, wherein the processor is further used for calculating a difference between the first start time and the second start time, when the difference is larger than the pre-determined period, then the processor determines that the first event belongs to the first input device when the processor receives the first signal, and the processor determines that the second event belongs to the second input device when the processor receives the second signal.

9. The touch device according to claim 1, wherein the first input device is a cylinder or a cone.

10. The touch device according to claim 1, wherein the touch screen is an optical touch screen.

11. A touch device identification method, comprising:
   touching, at a first start time, on a touch screen at a first position with a first touch area by a first input device;
   generating a first event by the touch screen;
   transmitting a first signal to the touch screen by the first input device; and
   determining, by a processor, that the first event belongs to the first input device and the first position is a start position of the first input device when the touch screen receives the first signal during a pre-determined period from the first start time and the first touch area is larger than a first area threshold.

12. The touch device identification method according to claim 11, wherein when the first input device touches the touch screen with a touch area which is smaller than or equivalent to a second area threshold, at least one touch is ignored, when the touch area is larger than the second area threshold, the first event is generated.

13. The touch device identification method according to claim 11, wherein the first signal comprises a first identification code, the processor designates the first identification code to the first input device, when the first input device keeps touching on the touch screen, the touch screen displays a pattern at the start position corresponding to the first input device.

14. The touch device identification method according to claim 13, further comprising:
   storing, by a storage device, the first identification code corresponding to the first event, a second identification code corresponding to a second event, the first start time corresponding to the first event, a second start time corresponding to the second event, the first touch area corresponding to the first event and a second touch area corresponding to the second event.

15. The touch device identification method according to claim 11, further comprising:
   touching, at a second start time, on the touch screen at a second position with a second touch area by a second input device, wherein the touch screen generates a second event, the second input device transmits a second signal to the touch screen, the first touch area is larger than the second touch area; and if the touch screen receives the second signal during the pre-determined period from the second start time and the second touch area is smaller than the first area threshold, the processor determines that the second event belongs to the second input device and that the second position is a start position of the second input device.

16. The touch device identification method according to claim 15, wherein the second signal comprises a second identification code, the processor designates the second identification code to the second input device, when the second input device keeps touching on the touch screen and the second input device moves on a surface of the touch screen, the touch screen displays a movement trace of the second input device corresponding to the start position of the second input device.

17. The touch device identification method according to claim 15, wherein the first start time and the second start time are the same time.

18. The touch device identification method according to claim 15, wherein the processor is further used for calculating a difference between the first start time and the second start time, when the difference is larger than the pre-determined period, then the processor determines that the first event belongs to the first input device when the processor receives the first signal, and the processor determines that the second event belongs to the second input device when the processor receives the second signal.

19. The touch device identification method according to claim 11, wherein the first input device is a cylinder or a cone.

20. The touch device identification method according to claim 11, wherein the touch screen is an optical touch screen.

* * * * *